Feb. 26, 1952  S. C. ROCKAFELLOW  2,587,385
ELECTRICAL CONTROL SYSTEM
Filed Nov. 21, 1946
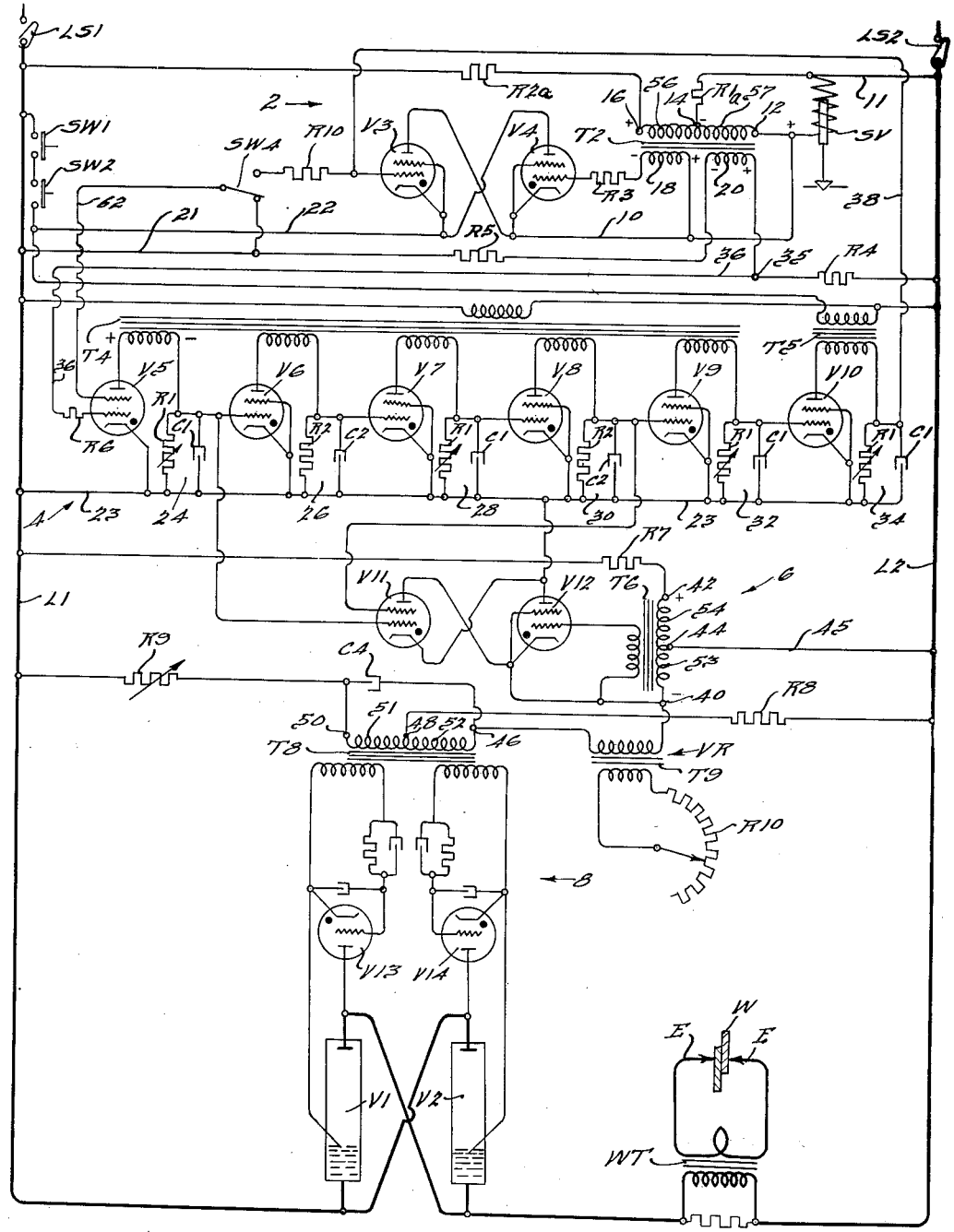
INVENTOR.
Stuart C. Rockafellow.
BY
*Harness, Dickey & Pierce.*
ATTORNEYS Patented Feb. 26, 1952

2,587,385

UNITED STATES PATENT OFFICE 2,587,385

ELECTRICAL CONTROL SYSTEM

Stuart C. Rockafellow, Farmington, Mich., assignor to Weltronic Company, Detroit, Mich., a corporation of Michigan Application November 21, 1946, Serial No. 711,430

15 Claims. (Cl. 250—27)

This invention relates generally to electrical control systems, which systems are particularly adapted, among other uses, for controlling the grid bias of an electronic valve.

The principal objects of the present invention are to provide a control network of the above type which is simple in arrangement and operation; to provide such a network which is energizable at will to control the conduction of the electronic valve; to provide in such a controlling network a pair of reversedly arranged control valves which, when conducting, will place a blocking bias on the valve controlled by the network; and to provide generally a new and improved electrical control system of the type described. Further objects will be apparent from the specification and the appended claims.

A preferred but illustrative embodiment of the invention is shown in the accompanying drawing in which the sole figure thereof is a diagrammatic view of the control system for a resistance welder embodying the invention. It will be apparent from a complete understanding of the invention that in a generic sense the improvements thereof may be embodied in electrical control systems intended for various specific purposes and that this control system may be variously arranged. In its present preferred form, the invention is utilized to control the bias on an electronic control valve and, by way of illustration but not of limitation, the invention is so disclosed herein.

Referring to the drawing, an initiating network 2 controls a sequence network 4 which controls a phase-shifting network 6 for controlling the firing of an igniting network 8 which controls the firing of a pair of reversedly arranged welding current-controlling valves V1 and V2 which control the flow of current through a welding transformer WT. Upon closure of the switches SW1 and SW2 the valves V3 and V4 of network 2 are rendered conductive for initiating the operation of the sequence network 4 which controls the various sequential steps of a welding machine with which the welding transformer WT is associated. Immediately upon conduction of the valves V3 and V4, valve V5, which was previously conductive, is blocked starting the timing out of its impedance network which controls the "clamping or squeeze time interval" or time interval when the electrodes E are being held against the work W prior to the initiation of the welding current therebetween.

At the end of this clamping time the valves V11 and V12 conduct whereby the phase-shifting network 6 shifts the phase of the voltage applied to the valves V13 and V14 so that these valves are rendered conductive to ignite the main power-controlling valves V1 and V2 for supplying electrical energy to the welding transformer WT. At the end of the "weld time" the valves V11 and V12 are rendered nonconductive by the network 4 thereby shifting the phase of the output voltage of the phase-shifting network 6 whereby the valves V13 and V14 are blocked to prevent conduction of the valves V1 and V2, thus de-energizing the welding transformer WT.

Referring more specifically to the network 2, this initiating network comprises generally a pair of reversedly arranged electronic control valves V3 and V4. The anode of the valve V3 is connected to the cathode of the valve V4 and through a conductor 10 to one terminal of the energizing winding of a solenoid valve SV which, when energized, admits fluid to move the electrodes E into engagement with the work W. The other terminal of this winding is connected to the line L2 by a conductor 11. A control transformer T2 has a center tapped primary winding, one end terminal 12 of which is connected to the conductor 10, and a center terminal 14 of which is connected through a resistor R1a and conductor 11 to the line L2. The opposite end terminal 16 of the transformer T2 is connected through a resistor R2a to the line L1. A secondary winding 18 of the transformer T2 has one terminal connected through a resistor R3 to the control grid of the valve V4 and its other end terminal connected to the cathode of this valve for controlling the grid bias thereof. Another secondary winding 20 has one of its end terminals connected through a resistor R4 to the line L2 and its other end terminal connected through a resistor R5 and conductor 21 to the line L1 for a purpose to be described hereinafter. A conductor or bus 22 connects the cathode of valve V3 and anode of valve V4 through switches SW1 and SW2 to the line L1.

The network 4 comprises valves V5, V6, V7, V8, V9, and V10 having their cathodes connected to a common cathode bus 23 which is connected to the line L1. A transformer T4 has its primary winding connected between the lines L1 and L2 and has a plurality of secondary windings, one such secondary winding for each of the valves V5–V9. One end terminal of each of the secondary windings of the transformer T4 is directly connected to the anode of the respective one of the valves V5–V9 with which it is associated, while the other terminal of each of the secondary windings is connected through an impedance network 24, 26, 28, 30, or 32 respectively to the common cathode bus 23. A transformer T5 has its primary winding connected between bus 22 and line L2. The secondary winding thereof has one terminal connected to the anode of valve V10 and its other terminal connected through an impedance network 34 to the bus 23.

The networks 24, 28, 32, and 34 comprise parallelly connected variably resistors R1 and condensers C1. The value of each of the resistors R1 and of the capacitors C1 are so interrelated that subsequent to blocking of the respective valve with which they are associated, a predetermined desired time is required for the respective capacitor C1 to discharge through its respective resistor R1. The network 24 is determinate of the clamping time, the network 28 being determinate of the welding time, the network 32 being determinate of the hold time or time subsequent to discontinuance of the welding current before the electrodes E are removed from the work W and the network 34 being determinate of the off time of the control system or time during which the electrodes E are held in a separated position during a series of welds and during which time the work W may be moved from one weld position to the next weld position.

The networks 26 and 30 comprise parallelly connected resistors R2 and capacitors C2. The values of the resistors R2 and capacitors C2 are so chosen that the resistor R2 discharges through its capacitor C2 in the matter of only one or two cycles of the voltage appearing across the lines L1 and L2 and therefore, from a welding cycle standpoint, have no discharge time.

The potential of the junction 35 between the resistor R4 and the winding 20 relative to that of the bus 23 is transmitted by means of a conductor 36 and a resistor R6 to the control grid of the valve V5. The control grid of the valve V6 is connected to the junction between the network 24 and the respective secondary winding of the transformer T4 so that when the network 24 is energized a negative bias is placed upon the grid of the valve V6 with respect to its cathode so that this valve V6 is held blocked. Similarly, the grids of the valves V7, V8, V9, and V10 are connected to the junction between the networks 26, 28, 30, and 32 and the secondary windings of the transformer T4 with which they are associated so that whenever the valves V6, V7, V8, and V9 are conducting, the valves V7, V8, V9, and V10 will be held in blocked condition. The junction between the network 34 and the associated secondary winding of transformer T5 is connected by means of conductor 38 to the grid of valve V3.

The phase-shifting network 6 comprises a center tapped transformer T6 having a center-tapped primary winding with end terminals 40 and 42 and a center terminal 44. The terminal 44 is directly connected to the line L2 by a conductor 45, while the terminal 42 is connected through a resistor R7 to the line L1. The terminal 40 is connected through a variable reactor VR to one end terminal 46 of a center tapped primary winding of a transformer T8. The center tapped winding of this transformer T8 has a center terminal 48 and an opposite end terminal 50. The terminal 48 is connected through a resistor R8 to the line L2. The terminal 50 is connected through a variable resistor R9 to the line L1 and a capacitor C4 is connected across the terminals 46 and 50. The primary winding portion 51 between the terminals 48 and 50 is therefore energized directly from the lines L1 and L2. The variable reactor VR, as shown, comprises a transformer T9, the primary winding of which is connected between the terminals 40 and 46 and the secondary winding of which is connected to a variable resistor R10. As the value of the resistor R10 is increased, the effective reactance of the variable reactor VR will correspondingly increase and vice versa for adjusting the amplitude and phase of the voltage being applied to the winding portion 52 between the terminals 46 and 48 of the transformer T8.

Energization of the winding portion 52 is controlled by means of the reversedly arranged leading and trailing valves V11 and V12. The valve V12 has its grid connected to one terminal of the secondary winding of the transformer T6 and its cathode connected to the other terminal of this secondary winding. Upon conduction of the valve V11 the "kick" winding portion 53 between terminals 40 and 44 of the transformer T6 is energized in opposition to the continually energized winding portion 54 between terminals 42 and 44, so that the blocking bias normally maintained on the grid of the valve V12 by the portion 54 is removed, thereby permitting the valve V12 to conduct during each subsequent half cycle to the half cycle in which the valve V11 is conductive.

One of the control grids of the valve V11 is connected to the control grid of the valve V6 while the other control grid of the valve V11 is connected to the control grid of the valve V9. Therefore, if either of the control grids of the valve V11 is negative with respect to the cathode thereof, the valve V11 will not conduct, and consequently the valve V11 and its trailing valve V12 conduct only when the valves V6 and V9 are conducting. The primary winding portion 51 of the transformer T8 is continually energized due to its continual connection from the line L1 through the resistor R9, the terminal 50, the terminal 48, and the resistor R8 to the line L2. The other portion 52 of the primary winding of the transformer T8 is energized only when the valves V11 and V12 are conducting.

The secondary windings of the transformer T8 are connected respectively between the control grid and cathode of the valves V13 and V14 respectively, and these windings are so phased with respect to the potential impressed between the terminals 48 and 50 that the potential of the grid with respect to the cathode of each valve V13 and V14 is negative whenever the anode potential of these valves V13 and V14 is positive so that they are maintained blocked. When, however, the valves V11 and V12 conduct, a potential is impressed across the winding portion 52 of the transformer T8 which shifts the phase of the output voltage of the secondary windings so that the grids of the valves V13 and V14 are rendered at the proper bias potential, with respect to the cathodes of these valves at a predetermined point on the wave of the voltage appearing between the anodes and cathodes thereof, to render them conductive once each cycle at this predetermined point. The initial point is determined by the adjustment of the resistor R10. As the valves V13 and V14 are rendered conductive, a critical potential is placed between the igniter and cathode of the valves V1 and V2 so that they are rendered conductive at the same place on the voltage wave as are the valves V13 and V14 whereby a predetermined amount of welding energy is supplied to the welding transformer WT each cycle. The specific operation of the network is more fully described and claimed in the copending application of Cletus J. Collom Serial No. 696,950, filed September 13, 1946, and assigned to the same assignee as this invention. The phase-shifting network 6 is more completely shown and described in the copending application of Cletus J. Collom Serial No. 714,586, filed December 6, 1946, now patent No. 2,480,000, dated August 23, 1949 and which is also assigned to the same assignee as this application.

It is believed that the remaining constructional details may be best described by a reference to the operation of the welding control system which is as follows. Assuming that it is desired to condition the system for operation, the line switches LS1 and LS2 are closed, energizing the conductors L1 and L2 and thereby energizing the primary winding portion 56 of the transformer T2 intermediate the terminals 14 and 16, the primary winding of the transformer T4 and the primary winding portion 54 of the transformer T6 and the primary winding portion 51 of the transformer T8. Energization of the primary winding portion 56 causes the secondary winding 18 to impress between the grid and cathode of the valve V4 a blocking potential whereby the valve V4 is maintained blocked. Energization of the transformer T4 energizes the anode circuits of each of the valves V5, V6, V7, V8, and V9, while energization of the winding portion 51 causes a blocking bias to be applied to valves V13 and V14.

The polarity of the secondary winding 20 of the transformer T2 is so chosen that when the transformer T2 is energized by means of the winding portion 56, with the terminal 12 disconnected from the line L1, a positive potential will be impressed upon the lower control grid of the valve V5 with respect to the cathode thereof and the valve V5 maintained in a conducting condition. Since valve V5 is conducting, a potential drop will appear across the impedance network 24 and the grid of the valve V6 and the lower control grid of the valve V11 will be held negative with respect to the cathodes thereof. The valves V6 and V11 consequently will be in a blocked condition. Since the valve V6 is blocked, there will be no current flow through and therefore no potential drop across the impedance network 26, and the valve V7 will be conducting setting up a potential drop across the impedance network 28 which maintains the grid of the valve V8 negative with respect to the cathode thereof and the valve V8 blocked. Since the valve V8 is not conducting, there will be no potential drop across the impedance network 30 and the valve V9 will be in a conducting condition. Since the valve V9 is conducting, a potential drop will appear across its impedance network 32, and the grid of the valve V10 will be held negative with respect to the cathode thereof. The switch SW2 being open, the transformer T5 will be de-energized and valve V10 will not conduct and no potential drop will appear across the impedance network 34. The control grid of the valve V3 under these conditions will be at substantially the same potential as the cathode thereof. The valve V3, however, will not conduct because of the open condition of the switch SW2 which is manually operable to initiate operation of the control system. The switch SW1 is closed in response to a condition of the welding machine which may, for example, be a condition in which suitable coolant is flowing to cool the electrodes E. Therefore, when the welding machine is in condition for operation, the switch SW1 will be maintained in closed-circuit position. Upon closure of the switch SW2, the transformer T5 will be energized, but, due to the grid-cathode bias of the valve V10, it will remain nonconductive. Closing of the switch SW2 also completes a circuit from the line L1 through the switches SW1 and SW2 and conductor 22 to the valves V3 and V4, whereby anode potential is applied to the valves V3 and V4. Since the conductor 10 is already connected through the energizing winding of the solenoid valve SV to the line L2, as soon as switch SW2 is closed the valve V3 will fire, causing current to flow between the lines L1 and L2 through the energizing winding of the solenoid valve SV, thereby actuating the valve for admitting fluid pressure which forces the electrodes E against the work W.

Since the winding portion 57 is connected in parallel circuit with the energizing coil of the solenoid valve SV, current will flow therethrough and will tend to set up a flux in the opposite direction to that caused by the current flow through the winding portion 56. The value of the resistance R2a is so chosen that the current flow through the winding portion 56 is equal to that through the winding portion 57, so that no flux will be induced in the core of the transformer T2 when portions 56 and 57 are both energized. Since no flux is being induced in the core of this transformer T2, the blocking grid bias on the valve V4 will be discontinued and the valve V4 will be in a condition to conduct each subsequent half cycle to the half cycle in which the valve V3 is conducting. This effective de-energization of the transformer T2 also removes the voltage induced in the winding 20 so that the junction 35 will assume a potential intermediate that of the lines L1 and L2 and which is proportioned to the value of the resistors R4 and R5 but which potential, however, will be negative with respect to the line L1 when the line L1 is positive.

Since the polarity of the secondary winding of the transformer T4 which is associated with the valve V5 is so arranged relative to the lines L1 and L2 that the anode of the valve V5 is positive when the line L1 is positive, the deenergization of the transformer T2 will render the valve V5 in blocked condition. Blocking of the valve V5 initiates the beginning of the squeeze-time period, since it occurs substantially simultaneously with the positive engagement of the electrodes E with the work W. At the end of the time period for which the resistor R1 of the network 24 has been adjusted, the potential across the resistor R1 will have dropped sufficiently so that the valve V6 is rendered conductive to set up a potential drop across the impedance network 26 ending the squeeze-time period and initiating the welding period.

This "timing out" of the network 24 removes the strong negative bias on the lower control grid of the valve V11, and, since, as hereinbefore described, the valve V8 is normally non-conducting, the upper control grid of valve V11 will be at the same potential as its associated cathode, the valve V11 will conduct or fire, shifting the phase of the output voltage of the phase-shifting network 6 for firing the igniting network 8 whereby the power valves V1 and V2 will energize the transformer WT for supplying welding current between the electrodes E.

Conduction of the valve V11 causes current to flow from the line L2 through the resistor R8, through the winding portion 52 of the transformer T8, through the variable reactor VR, through the valve V11 and the bus 23 to the line L1. When the voltage of the line L1 is positive with respect to the voltage of line L2, current will flow in the reverse direction to the above-described circuit but will flow through the valve V12 instead of the valve V11. Current flow through the valves V11 and V12 also closed a circuit for current flow through the winding portion 53 of the transformer T6. This flow of current through this winding portion 53 tends to set up a flux which opposes the flux induced in the core of the transformer T6 due to current flow through the winding portion 54 so that the negative grid bias on the valve V12 is removed to render the valve V12 in condition to conduct during subsequent half cycles to the half cycles to which the valve V11 is conductive. The value of the resistor R7 is selected such that the current flow through the winding portions 53 and 54 concurrently sets up no flux in the core of the transformer T6.

Valves V11 and V12 will continue to conduct throughout the entire welding time interval which is controlled by the time characteristic of the impedance network 28, which network was de-energized and started to time out the welding period at the time the valve V7 was rendered nonconductive or blocked, which was substantially the same time that the valve V11 was rendered conductive. As soon as the potential across the resistor R1 of the network 28 drops to the predetermined potential at which the valve V8 conducts, valve V8 conducts and sets up a potential drop across its impedance network 30, thereby rendering the control grid of the valve V9 negative with respect to the cathode thereof and blocking the valve V9. The upper control grid of the valve V11 which is connected with the control grid of the valve V9 will also be rendered negative with respect to the cathode of the valve V11 to block the valve V11. The valve V12 will be blocked at the end of the subsequent half cycle to the half cycle in which the valve V11 last conducts, since no current will flow through the winding portion 53 of the transformer T6, and consequently the other winding portion 54 will set up a flux in the core of the transformer T6, causing the secondary winding thereof to impress a negative bias on the control grid of the valve V12. Blocking of the valves V11 and V12 de-energizes the winding portion 52 of the transformer T8 whereby the phase of the output voltage of the secondary windings thereof is shifted to maintain the valves V13 and V14 blocked to hold the valves V1 and V2 nonconductive and stop the flow of welding current.

Subsequently to the blocking of the valve V9 the impedance network 32 will begin to time out the hold time period due to the discharge of its resistor R1 through its associated capacitor C1. After the expiration of the predetermined hold time interval, the off time period, or interval in which the electrodes are separated from the work W and it is moved to the next weld position, occurs. At this time the negative bias on the grid of the valve V10 with respect to the cathode thereof will disappear and the valve V10 will be rendered conductive, setting up a potential drop across its impedance network 34. This potential drop across the network 34 is transmitted to the grid of the valve V3 by the conductor 38, thereby blocking the valve V3. Since the valve V4 is purely a trailing valve and trails the valve V3 similarly to the trailing of valve V12 with respect to the valve V11, the valve V4 will also block at the end of the subsequent half cycle to the half cycle in which the valve V3 last conducts. Blocking of the valves V3 and V4 de-energizes the actuating coil of the solenoid valve SV and the winding 57 of the transformer T2. De-energization of the solenoid valve SV causes the fluid electrodes E to move back from and release the work W while the de-energization of the winding portion 57 of the transformer T2 allows the winding portion 56 to induce a flux in the transformer coil thereof causing a voltage to be induced in the secondary windings 18 and 20. The winding 18, as hereinbefore described, holds the valve V4 blocked while the potential induced in the winding 20 changes the potential of the junction 35 from a potential which is negative with respect to the line L1 to a potential which is equal to or slightly more positive than the potential of the line L1.

This positive potential will be transmitted by conductor 36 to the lower control grid of the valve V5 and the valve will conduct and initiate a resetting of the network 4, it being understood that at this time the upper control grid of the valve V5 is at cathode potential through conductor 62 and switch SW4. A potential drop will appear across the impedance network 24 which again places a negative bias on the control grid of the valve V6, blocking the same and removing, after a cycle or two, the potential drop across the impedance network 26 whereby the valve V7 is again rendered conductive to set up a potetnial drop across the impedance network 28 which renders the valve V8 blocked. The network 30 quickly de-energizes in a cycle or two, removing the negative grid bias on the valve V9 and setting up a potential drop across the impedance network 32 which renders the control grid of the valve V10 highly negative with respect to the cathode thereof and the valve V10 blocked. This resetting sequence of the valves V5, V6, V7, V8, V9, and V10 occurs very rapidly because each of the impedance networks which are de-energized has little or no time therein, and, since it takes little or no time to set up the potential drop across the time networks, the total time elapse for the resetting is extremely small, amounting to only a few cycles. When the valve V10 becomes de-energized, the network 34 commences to time out, the time required being substantially that of the off time period of the system. At the expiration of the off time interval, the potential across the resistor R1 of the network 34 will be dissipated through the capacitor C1 associated therewith, removing the negative bias on the control grid of the valve V3 with respect to the cathode thereof, so that the valve V3 is again rendered in a conductive condition. If the switch SW2 is still closed, indicative that additional welds are desired, the valve V3 is again fired to initiate another welding cycle, and the subsequent sequence of operation will be exactly the same as when the valve V3 was originally fired by the closure of the switch SW2.

As long as the switch SW2 is maintained closed, the network will go through repeating welding cycles. If it is desired that the network make only one complete welding cycle and then stop irrespective of the positioning of the switch SW2, the single-pole, double-throw control switch SW4 is moved from the position shown in which the bus 21 is connected through a conductor 62 to the upper control grid of the valve V5 to its other position in which the conductor 62 is connected to the conductor 38 through a resistor R10. When the conductor 38 is rendered negative with respect to bus 23 and conductor 21 due to conduction of the valve V10, the upper control grid of the valve V5 will be rendered negative with respect to its cathode to hold the valve V5 blocked. Since to reset the sequence network 4 and to initiate the timing out of the off time network 34 the valve V5 must be rendered conductive, the holding of the valve 5 will maintain the valves V3 and V5 blocked as long as the switch SW2 is closed. Upon opening of the switch SW2, the transformer T5 will be de-energized, starting the timing out of the impedance network 34. Subsequently to the timing out, the valve V5 will be rendered conductive to reset the impedance network 4; but since the switch SW2 is now open and the anode circuits thereof are de-energized, the valve V3 will not conduct and the networks will remain in the same condition as when the line switches LS1 and LS2 were closed.

What is claimed and is desired to be secured by United States Letters Patent is as follows:

1. An electrical control network for an electronic valve having a pair of principal electrodes and a control electrode, comprising a pair of input terminals adapted to be connected to a first source of electrical potential, a pair of impedance elements connected in series circuit between said terminals, a normally energized element providing a second source of electrical potential connected in series with said elements, means connected across at least one of said elements for applying a potential difference between said control electrode and one of said principal electrodes, an energizable control element regulating a function to be corrected with the conductive condition of said valve, and means operable to concurrently de-energize said normally energized element and energize said control element.

2. An electrical control network for an electronic valve having a pair of principal electrodes and a control electrode, comprising a pair of input terminals adapted to be connected to a first source of electrical potential, a pair of impedance elements connected in series circuit between said terminals, an energizable element providing a second source of electrical potential connected in series with said elements, means connected across at least one of said elements for applying a potential difference between said control electrode and one of said principal electrodes, and means for selectively regulating a first controlling function associated with a controlling function regulated by said valve and concurrently controlling the energization of said energizable element whereby the potential applied between said control electrode and said one electrode is altered whereby the conductivity of said valve is regulated.

3. An electrical control network for an electronic valve having a pair of principal electrodes and a control electrode, comprising a pair of input terminals adapted to be connected to a first source of electrical potential, a pair of impedance elements connected in series circuit between said terminals, an energizable element providing a second source of electrical potential connected in series with said elements, means connected across at least one of said elements for applying a potential difference between said control electrode and one of said principal electrodes, and means for selectively energizing said energizable element in a polarity to produce a potential thereacross opposite in polarity with the potential at said terminals.

4. In an electrical control system, an electronic control valve having a pair of principal electrodes and a control electrode, means providing an electrical circuit including said principal electrodes, a control circuit for said valve, said control circuit comprising a pair of series-connected impedance elements adapted to be connected between a source of electrical energy, energizable means providing a source of electrical energy connected in series with and intermediate said elements and operable when energized to impress upon said control circuit a potential opposite in polarity to that impressed on said control circuit by said first-named source, and means connecting the junction of one of said elements with said energizable means to said control electrode and connecting one of said principal electrodes to a different point in said circuit.

5. In an electrical control system, a pair of terminals adapted to be supplied with alternating current potential, an electronic valve having a pair of principal electrodes and a control electrode, a controlling network connected between said terminals comprising a pair of resistors and a transformer, a secondary winding of said transformer being connected in series with and intermediate said resistors and so phased that its output voltage opposes that supplied to said network by said terminals, means connecting one of said terminals to one of said principal electrodes, means connecting the junction of said secondary winding with one of said resistors to said control electrode, and means providing a circuit between said principal electrodes.

6. The combination of claim 5 in which said circuit means includes a transformer for supplying a positive potential to the other of said principal electrodes with respect to said one principal electrode when said one terminal is positive with respect to said other terminal.

7. In an electrical control system, a pair of terminals adapted to be supplied with alternating current potential, transformer means having a pair of input windings and an output winding, said output winding having a pair of taps, means connecting one of said input windings between said terminals, means including switch means for connecting the other of said input windings between said terminal in a polarity to produce a voltage in said output winding opposite in phase to the voltage induced in said output winding by said one input winding, an electronic control valve having a principal electrode and a control electrode, an impedance means having a pair of terminals, means connecting one terminal of said impedance means to one of said pair of terminals and another of said terminals of said impedance means to one of said taps of said output winding and to said control electrode, means connecting said principal electrode to the other of said pair of terminals, and circuit means connecting another of said taps of said output winding to said other terminal.

8. In an electrical control system, a pair of terminals adapted to be supplied with alternating current potential, transformer means having a pair of input windings and an output winding, said output winding having a pair of taps, means connecting one of said input windings between said terminals, means including switch means for connecting the other of said input windings between said terminals in a polarity to produce a voltage in said output winding opposite in phase to the voltage induced in said output winding by said one input winding, an electronic control valve having a principal electrode and a control electrode, an impedance means having terminals, means connecting one terminal of said impedance means to one of said pair of terminals and another of said terminals of said impedance means to one tap of said output winding and to said control electrode, means connecting said principal electrode to the other of said pair of terminals, and impedance means connecting said other terminal to another of said taps of said output winding.

9. The combination of claim 8 in which said switch means comprises a pair of reversedly arranged electronic valves.

10. In an electrical control system, a pair of terminals adapted to be supplied with alternating current potential, transformer means having a pair of input windings and an output winding, said output winding having a pair of taps, means connecting one of said input windings between said terminals, means including switch means for connecting the other of said input windings between said terminals in a polarity to produce a voltage in said output winding opposite in phase to the voltage induced in said output winding by said one input winding, an electronic control valve having a principal electrode and a control electrode, an impedance means having end terminals and an intermediate terminal, means connecting one end terminal of said impedance means to one of said pair of terminals and said intermediate terminal of said impedance means to one of said taps of said output winding and to said control electrode, means connecting said principal electrode to the other of said pair of terminals, and circuit means connecting another of said taps of said output winding to said other terminal.

11. In an electrical system operable from an alternating current supply, a pair of controlling circuits for coordinated operation, an electric valve operable to control one of said circuits, a pair of reversedly arranged electric valves operable to control the energization of the other of said circuits, circuit controlling means arranged to regulate the time interval during which one of said pair of valves is in a first condition, circuit means controlling the flow of current through the other of said pair of valves, means including a transformer having a first winding connected to control said last-named circuit means as a function of its output voltage, said transformer also having second, third, and fourth windings, means normally energizing said second winding with a potential of proportional frequency to that of the supply, said third winding being connected in series with said pair of valves and phased with respect to said second winding to oppose the effect of said second winding, and network means controlled by the potential across said fourth winding for regulating the conductivity of said first-named electric valve.

12. In an electrical system operable from an alternating current supply, a pair of controlling circuits for coordinated operation, circuit controlling means operable to control one of said circuits, a pair of reversedly arranged electric valves operable to control the energization of the other of said circuits, circuit controlling means arranged to regulate the time interval during which one of said pair of valves is in a first condition, circuit means controlling the flow of current through the other of said pair of valves, means including a transformer having a first winding connected to control said last-named circuit means as a function of its output voltage, said transformer also having second, third, and fourth windings, means normally energizing said second winding with a potential of proportional frequency to that of the supply, said third winding being connected in series with said pair of valves and phased with respect to said second winding to oppose the effect of said second winding, and network means controlled by the potential across said fourth winding for regulating said first-named circuit controlling means.

13. In an electrical sytsem operable from an alternating current supply, a pair of controlling circuits for coordinated operation, an electric valve operable to control one of said circuits and having a principal electrode and a control electrode, a pair of reversedly arranged electric valves operable to control the energization of the other of said circuits, circuit controlling means arranged to regulate the time interval during which one of said pair of valves is conductive, circuit means controlling the flow of current through the other of said pair of valves, means including a transformer having a first winding connected to control said last-named circuit means as a function of its output voltage, said transformer also having second, third, and fourth windings, means normally energizing said second winding from the supply, said third winding being connected in series with said pair of valves and phased with respect to said second winding to oppose the effect of said second winding, and network means controlled by the potential across said fourth winding for applying a bias potential between said electrodes.

14. In an electrical network adapted to be energized from an alternating current supply, a pair of reversedly arranged electric valves arranged in leading and trailing relationship and adapted to control by means of a change in their conductive condition a pair of coordinated controlling circuits, a transformer having a plurality of windings, one of said windings being operatively connected to the trailing one of said valves for controlling the application of a bias potential thereto, means for energizing a second of said windings from the supply, circuit means energized as a consequence of the conduction of said valves and connected to energize a third of said windings, and circuit means connected across said fourth winding and operable to transmit a control potential as a function of the output voltage of said fourth winding.

15. In an electrical network adapted to be energized from a pair of terminals supplied from an alternating current supply, a pair of reversedly arranged electric valves arranged in leading and trailing relationship and adapted to control through change in their conductive condition a pair of coordinated controlling circuits, a transformer having a plurality of windings, one of said windings being operatively connected to the trailing one of said valves for controlling the application of a bias potential thereto of such polarity and potential as to maintain said trailing valve non-conductive, means for energizing a second of said windings from the supply for actuating said one winding, circuit means energized as a consequence of the conduction of said valves and connected to energize a third of said windings, said third winding being connected to oppose the effect of said second winding, an impedance circuit means connecting one terminal of said fourth winding to one of said supply terminals, circuit means connecting another terminal of said fourth winding through said impedance to the other of said supply terminals, and circuit means connected between said fourth winding other terminal and said one supply terminal for transmitting a control potential as a function of the output voltage of said fourth winding.

STUART C. ROCKAFELLOW.

REFERENCES CITED

The following references are of record in the file of this patent:

UNITED STATES PATENTS

| Number | Name | Date |
|---|---|---|
| 1,925,011 | Suits | Aug. 29, 1933 |
| 2,024,838 | Stansbury | Dec. 17, 1935 |
| 2,289,321 | Collom | July 7, 1942 |
| 2,428,592 | Stadium | Oct. 7, 1942 |